Figure 1:
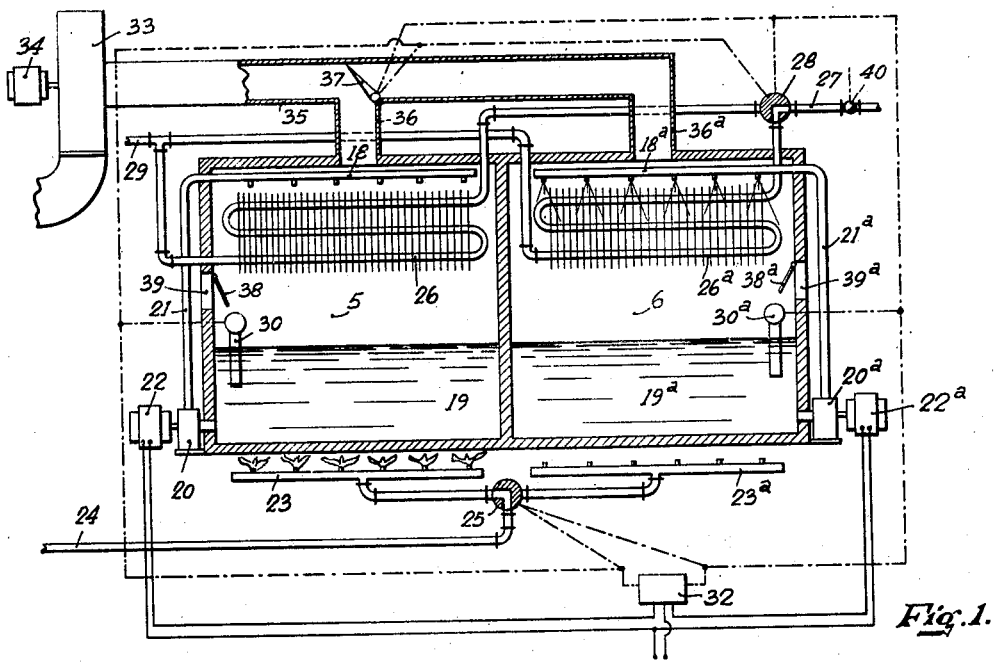

Sept. 3, 1940.   H. SEID   2,213,350

AIR CONDITIONING APPARATUS

Filed May 12, 1938

INVENTOR.
HERMAN SEID

BY Herman Seid

ATTORNEY

Patented Sept. 3, 1940

2,213,350

UNITED STATES PATENT OFFICE 2,213,350

AIR CONDITIONING APPARATUS

Herman Seid, New York, N. Y., assignor to Auditorium Conditioning Corporation, Jersey City, N. J., a corporation of New Jersey Application May 12, 1938, Serial No. 207,516

1 Claim. (Cl. 261—2)

This invention relates to air conditioning.

The general object of the invention is to provide an air conditioning apparatus for controlling the moisture content of air or other gas which is to be conditioned.

In the conditioning of enclosures occupied by persons whose comfort and health are primary considerations, it is necessary that a quantity of outdoor air be supplied to such enclosures at all times, in order to meet the ventilation requirements of the occupants. Under summer operating conditions in most localities the fresh air thus supplied is usually hot and humid and requires reduction of its moisture content in order that it may be used to create and maintain comfortable atmospheric conditions within the enclosures. Also, in cooling enclosures for comfort, it is common practice to recirculate a portion of the air withdrawn from the enclosure. In conventional installations the quantity of air thus re-circulated may be of the order of four or five times the quantity of fresh air introduced into the enclosure. In its circulation through the occupied enclosure, the conditioned air is subject to a substantial increase in moisture content, due to the evaporation of water from the bodies of the occupants, as is well understood. Thus, in order that it may be suitably prepared for resupply to the enclosure, this air withdrawn from the enclosure for recirculation must also have its moisture content reduced in order that comfortable atmospheric conditions may be created and maintained in the enclosure.

Similarly, in certain industrial applications of air conditioning it is necessary to remove moisture from the air in order to provide desired atmospheric conditions.

Reduction of the moisture content of the air may be accomplished broadly by either of two methods, namely, dehumidification and dehydration. When the air is dehumidified, it is subjected to heat exchange with a cooling medium or refrigerant which reduces the dry bulb temperature of at least some of the air below the original dewpoint of the air, thus precipitating moisture from the air. This method has the disadvantage that the cooling process and the process of moisture reduction are definitely and inseparably interrelated, thus creating control problems. Further, the air which has been dehumidified is necessarily at a relatively low dry bulb temperature and hence, in most applications, must be reheated before it may be introduced into the enclosure to be conditioned.

An object of the present invention is to provide an apparatus for reducing the moisture content of air to be conditioned by dehydration, without cooling the air. Thus, the necessity for reheating is eliminated. Also, the process of moisture reduction is divorced from the process of controlling the temperature, so that these may be controlled independently. Accordingly, control problems are simplified.

Another object of the present invention is to provide an improved apparatus for conditioning air in which a liquid absorber is used. This process is based upon the fact that hygroscopic solutions as, for example, solutions of lithium chloride and calcium chloride, when they are brought in contact with air having a higher vapor pressure, will absorb moisture from the air with which they contact. As such a solution absorbs moisture from the air, due to the difference in the respective vapor pressures of the solution and of the air, the solution is diluted so that its vapor pressure is increased and its capacity for absorbing water from the air is decreased. In order that the solution may be kept at the proper strength, heat must be supplied to the solution in sufficient amount to evaporate excess moisture from the solution.

Accordingly, a feature of the invention resides in the provision of means for evaporating moisture from an absorber solution, thus to increase the density and vapor pressure of the solution, whereby it may function effectively to absorb moisture from air with which it is contacted.

Another feature of the invention resides in the provision of a pair of substantially identical units, each of which is adapted to serve as an air conditioning unit. These are arranged to operate alternately, so that as absorber solution in one of the units is being regenerated, air to be conditioned may be circulated with desired effect through the other unit.

Figure 2:
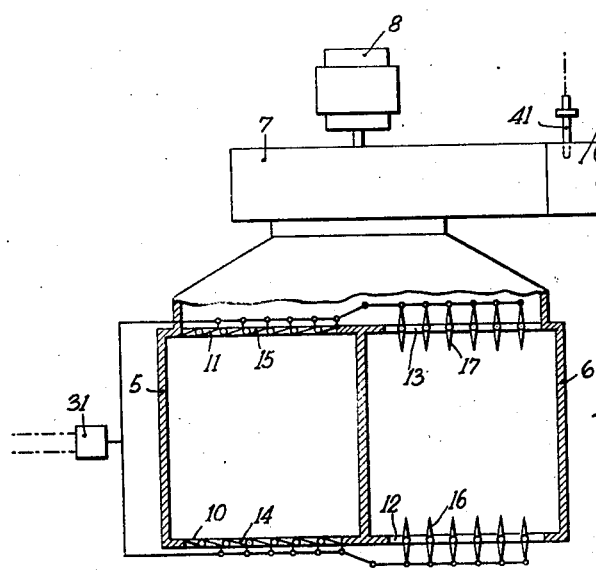

Other objects and features of the invention will be more apparent from the following description to be read in connection with the accompanying drawing, in which Fig. 1 diagrammatically represents an elevational view partly in section of apparatus in accordance with the invention, and Fig. 2 diagrammatically represents a plan view partly in section of the embodiment of the invention illustrated in Fig. 1.

Referring to the drawing, the numerals 5 and 6 designate generally two substantially identical air conditioning units arranged preferably in close proximity to or adjoining each other. Air to be conditioned is drawn through the units 5 and 6 under the influence of fan 7 actuated by motor 8, and the conditioned air is then delivered to an enclosure to be conditioned (not shown) through duct 9. The opposite ends of unit 5 are provided respectively with an inlet opening 10 and an outlet opening 11 for air circulating therethrough. Similarly, unit 6 is provided with an air inlet opening 12 and an air outlet opening 13. The openings 10 and 11 are provided respectively with dampers 14 and 15, adapted, when closed, to completely cut off the circulation of air through unit 6. Similarly, openings 12 and 13 are provided with dampers 16 and 17, respectively. The dampers 14 and 16 are differentially connected in any suitable manner, so that when dampers 14 are closed, dampers 16 are opened, and vice-versa. Similarly, dampers 15 and 17 are differentially connected so that when dampers 15 are closed, dampers 17 are opened, and vice-versa. Dampers 14 and 15 are connected in such manner that they are either opened or closed together. Thus, air may flow at any given time through either unit 5 or unit 6, but not through both of the units at the same time.

Unit 5 is provided with a spray device 18 for spraying the air passing through unit 5 with a moisture-absorbing salt solution of such a substance as lithium chloride or calcium chloride. This sprayed solution falls into the bottom of unit 5 which constitutes a sump 19 from which the solution is withdrawn by pump 20 for resupply through pipe 21 to the spray device 18. Pump 20 is actuated by a suitable electric motor or the like, 22. Similarly, unit 6 is provided with a spray device 18a, a sump 19a, motor 20a, pipe 21a and motor 22a.

Beneath unit 5 and adapted to heat the solution in sump 19 thereof, is positioned a heating device such as gas burner 23. Similarly positioned beneath the sump 19a of unit 6 is gas burner 23a. The burners 23 and 23a are supplied with fuel through feed line 24 in which there is interposed a valve 25. Valve 25 is arranged to supply fuel to gas burner 23 or 23a, but to only one of these burners at any given time. As will be understood, a pair of valves individually controlling the supply of fuel to the burners 23 and 23a could be provided without departing from the essence and spirit of the invention.

As is known, the absorption of moisture by a solution such as lithium chloride changes the moisture in the air from vaporous form to liquid form, thus releasing the latent heat of vaporization of such water vapor. The heat thus released tends to increase the temperature of the air being dehydrated. To offset this tendency of the air temperature to rise, due to the dehydration process, there is provided a cooling element such as coil 26 in the unit 5. Unit 6 is similarly provided with a cooling coil 26a. Suitable cooling medium, such as cold water from a city main or the like, is adapted to be supplied to the coils 26 and 26a through supply line 27. Supply line 27 is adapted to supply cooling medium selectively either to coil 26 or to coil 26a, due to the provision of control valve 28. As will be understood and as explained in connection with the supply of fuel to the gas burners, a pair of valves individually controlling the supply of fluid to the coils 26 and 26a might be substituted for the valve 28 without departing from the scope of the invention. Water which has circulated through the coils 26 and 26a is discharged through a suitable drain pipe 29. The coils 26 and 26a are preferably provided with extended surface such as spiral or plate finning whereby to increase their heat transfer capacity. It is preferred to place the spray devices 18 and 18a at a higher level than the coils 26 and 26a in order that the coils may cool not only the air circulating through the units 5 and 6 but also may cool the absorber solution delivered from the spray devices and falling in contact with the coils 26 and 26a. Further, such wetting of the coils increases their cooling capacity.

In the sump of each unit there is provided a suitable means for indicating the degree of dilution of the solution contained therein. Thus, the sump 19 is provided with a hydrometer 30 and the sump 19a is provided with a hydrometer 30a. As above explained, one of the units will be operative for conditioning air while the other is inoperative for this purpose but is being prepared for such service. Therefore, at all times during operation of the apparatus, one of the hydrometers will indicate a relatively low density of absorber solution while the other will respond to a density sufficiently high to enable the absorber solution properly to effect its desired water absorbing operation. Since the condition of the absorber solution in the respective units 5 and 6 determines which unit is to be operative at any given time, the hydrometers 30 and 30a, which respond to solution densities, are utilized selectively to control the operation of the two units.

Thus, when the absorber solution in sump 19a has a sufficiently high density to abstract moisture from air passed through unit 6 in an efficient manner, the hydrometer 30a reflecting this condition will, through suitable controls associated therewith, operate the dampers so that dampers 16 and 17 are in opened position, and dampers 14 and 15 in closed position. Thus, air may circulate through the unit 6 and not through the unit 5. The dampers may be operated by any suitable damper control mechanism, indicated generally as 31. Also, hydrometer 30a through electrical switch 32 will energize motor 22a, thus to operate the pump 20a which circulates absorber solution from the sump 19a to the spray device 18a. Hydrometer 30a will also actuate valve 28 so that cooling medium from pipe 27 will be circulated through coil 26a in unit 6 and not through coil 26 in unit 5.

During the period when unit 6 is operative for conditioning air passing therethrough, the absorber solution in unit 5 is regenerated in preparation for resumption of its air conditioning function. Accordingly hydrometer 30a, during the period when unit 6 is operative for air conditioning purposes, adjusts valve 25 in the fuel supply line 24 so that fuel is supplied to the burner 23 serving the unit 5. During the period of regeneration of units 5, the pump 20 is rendered inoperative.

There is provided an exhaust fan 33 actuated by motor or the like, 34, which serves to draw off and exhaust moisture evaporated during the regeneration process. Accordingly, the fan 33 connects to a duct 35 having a branch 36 connecting with unit 5 and a branch 36a connecting with unit 6. A damper 37 is provided for selectively providing communication between the fan 33 and one or the other of the units. During the period when unit 5 is being regenerated, damper 37 is in the position shown to provide communication between the fan 33 and the unit 5, so that moisture evaporated from solution in sump 19 may be readily discharged to the outdoor atmosphere or otherwise suitably disposed of. It may be noted that the pressure reduction within the unit 5 due to the action of fan 33 serves to facilitate the evaporation of moisture by lowering the boiling point of the water. If it is desired to circulate air through the unit 5 during regenerating periods an inwardly opening flap valve 38 may be provided in conjunction with a suitable opening 39 formed in the wall of the casing of unit 5.

Since the control elements per se used to control the valves 28 and 25, damper actuating device 31, selective electrical switch 32 and damper 37 are well-known and understood, no further description of these elements is deemed necessary here.

When the solution circulated through unit 6 has become so diluted by its contact, over a period of time, with air passing through the unit, the solution in unit 5 will be ready for active air conditioning service, due to its regeneration. Accordingly, hydrometer 30 acting in response to the increased density of the solution in sump 19 will open dampers 14 and 15, thus to permit air flow through unit 5, and close dampers 16 and 17, thus to shut off the flow of air through unit 6. Also, hydrometer 30 will then operate switch mechanism 32 to cut motor 22a out of service and to render motor 22 operative, thus to cause pump 20 to circulate absorber solution through unit 5. Hydrometer 30 will also actuate directional valve 25 so that regenerating fuel will be supplied to the burner 23a serving unit 6. Damper 37 will be adjusted so as to prevent air flow through duct branch 36, thus placing the unit 6 in communication with exhaust fan 34. As in the case of unit 5, an inwardly open flap valve 38a serving an opening 39a may be provided, if desired.

After the unit 5 has been in operation for a predetermined period, the sequence of operations will again be reversed so that unit 6 becomes operative and unit 5 inoperative, and this alternate operation of the two units will continue throughout the time during which air conditioning is required.

As will be understood, suitable pilot lights may be provided for the burners 23 and 23a. Also, it will be understood that instead of the hydrometers 30 and 30a, suitable float devices may be used to indicate the density of the solution. This follows from the fact that the salt with which each unit is initially charged remains within the unit, and hence the liquid level in the unit gives a direct indication of the density of the solution.

If desired, a valve 40 in a cooling medium supply line 27 may be provided to control quantitatively the supply of cooling medium to the coils 26 and 26a. Preferably, valve 40 is controlled thermostatically, as, for example, by thermostat 41 placed in the air supply duct 9 or at any other desired point in the air conditioning system.

The bottom portions of the units 5 and 6 are preferably formed of material having a relatively high heat conductivity, such as metal, in order that the units 5 and 6 may serve both as air conditioning chambers and as regenerating chambers to which heat is supplied from the burners 23 and 23a.

While as shown and described, the pumps 20 and 20a are operative at different times so that absorber solution is circulated through a passageway only when air to be conditioned is circulated through such passageway, it may be desired to operate the pumps during the regenerating period of the operating cycle as well as during the air conditioning period of the cycle. Circulation of heated absorber solution by the pumps to and through the spray devices assists in the liberation of water vapor from the solution and hence tends to hasten the concentration of the solution.

Since many changes may be made in the invention without departing from its scope, it is intended that all matter contained in the above description or shown in the accompanying drawing shall be interpreted as illustrative only and not in a limiting sense, applicant limiting himself only as indicated in the appended claim.

I claim:

A continuous cycle air dehydration and cooling system comprising a conditioning chamber divided into two compartments by a partition wall, adsorber solution in a sump portion of each compartment, a pump connected with each compartment and spray producing means in the upper part of each compartment served by the respective pump serving the compartment, a cooling coil in each compartment positioned above the sump area and beneath the spray producing means, a common exhaust passage having a pair of branch ducts, one branch duct connecting to the first compartment, the other branch duct connecting to the second compartment, a damper for connecting one branch duct to said common passage at a time, a common valve for supplying water to one of said coils at a time, heat generating means under each compartment, a common fuel supply for said means, a control for admitting fuel to one of said heat generating means at a time, and cycle operation regulating means responsive to conditions within said compartments for causing the pump and spray producing means and cooling coil for one of said compartments to be active while the corresponding apparatus for the second compartment remains inactive and simultaneously for causing the fuel supply means to serve the second compartment and the branch duct from said second compartment to connect with the common exhaust passage while fuel is cut off to the first compartment and the branch duct therefrom remains closed.

HERMAN SEID.